United States Patent
Masuda et al.

(10) Patent No.: US 8,739,931 B2
(45) Date of Patent: Jun. 3, 2014

(54) LUBRICATING STRUCTURE OF DIFFERENTIAL GEAR UNIT

(75) Inventors: Takahiko Masuda, Okazaki (JP); Masashi Ogawa, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 156 days.

(21) Appl. No.: 13/533,158

(22) Filed: Jun. 26, 2012

(65) Prior Publication Data

US 2013/0001018 A1 Jan. 3, 2013

(30) Foreign Application Priority Data

Jun. 29, 2011 (JP) .................................. 2011-144206

(51) Int. Cl.
*F16H 57/04* (2010.01)
(52) U.S. Cl.
USPC ........................................................ 184/6.12
(58) Field of Classification Search
USPC ........................................................ 184/6.12
See application file for complete search history.

(56) References Cited

FOREIGN PATENT DOCUMENTS

| JP | 51-65427 | 5/1976 |
|---|---|---|
| JP | 60-61558 | 4/1985 |
| JP | 62-194241 | 12/1987 |
| JP | 2004-211769 A | 7/2004 |
| JP | 2009-127794 A | 11/2009 |
| JP | 2010-144904 A | 7/2010 |

*Primary Examiner* — William E Dondero
*Assistant Examiner* — Mark K Buse
(74) *Attorney, Agent, or Firm* — Sughrue Mion, PLLC (57) ABSTRACT

A lubricating structure of a differential gear unit includes a differential case that rotatably supports side gears and pinions; a differential housing that rotatably supports the differential case via a bearing; and a lubrication hole that leads lubricating oil from a first chamber space formed between the differential case and the differential housing to a second chamber space formed around one drive shaft. A third chamber space is formed inside the differential case. A smallest passage sectional area of a lubricating oil flow path that leads from the second chamber space to the first chamber space via the bearing is smaller than a smallest passage sectional area of the lubrication hole, and a smallest passage sectional area between the second chamber space and the third chamber space and a smallest passage sectional area in the third chamber space are larger than the smallest passage sectional area of the lubrication hole.

10 Claims, 3 Drawing Sheets

LUBRICATING STRUCTURE OF DIFFERENTIAL GEAR UNIT

INCORPORATION BY REFERENCE

The disclosure of Japanese Patent Application No. 2011-144206 filed on Jun. 29, 2011 including the specification, drawings and abstract is incorporated herein by reference in its entirety.

BACKGROUND OF THE INVENTION

1. Field of the Invention

The invention relates to a differential gear unit, and more particularly, to a lubricating structure of a differential gear unit.

2. Description of the Related Art

A differential gear unit incorporated into a drive train of a vehicle such as an automobile, for example, has a pair of side gears and a pair of pinions that are in mesh with each other, and a differential case that rotatably supports these gears. The pair of side gears and the pair of pinions rotate in mesh with each other, and a pair of drive shafts that support the pair of side gears rotate relative to the differential case. Also, the pinions rotate relative to a pinion shaft that is supported by the differential case, the differential case rotates relative to a differential housing in which the differential case is housed, and a bearing is arranged between the differential case and the differential housing. Accordingly, parts that rotate relative to one another during differential rotation of the differential gear unit need to be lubricated by lubricating oil to reduce the frictional resistance of those parts. A variety of lubricating structures have been proposed for this.

For example, one well-known lubricating structure for a differential gear unit is configured to lead lubricating oil to a chamber space between the differential case and the differential housing, or to a chamber space around one drive shaft through a lubrication hole by a lubrication supply system. Another well-known lubricating structure has a spiral groove provided on an outside surface of one drive shaft or on an inside surface of a boss portion of a differential case that rotatably supports the one drive shaft, and is configured to supply lubricating oil into the differential case by the spiral groove.

In particular, Japanese Patent Application Publication No, 2010-144904 (JP 2010-144904 A) describes a lubricating structure of a differential gear unit, that has a ring plate in addition to a lubrication hole and a spiral groove. The ring plate has a tongue portion that leads lubricating oil that flows into a chamber space around a drive shaft through the lubrication hole provided in a differential housing to between the drive shaft and a boss portion of a differential case.

According to this related lubricating structure, lubricating oil is able to be supplied to the inside of the differential case and to between the drive shaft and the boss portion well compared with when the lubrication hole and the spiral groove are not provided or when the ring plate that has the tongue portion is not provided.

Typically in a differential gear unit, the drive shaft must be well supported, so the clearance between the drive shaft and the boss portion of the differential case is extremely small. Similarly, the clearance between the shaft portion of a side gear fixed to an inside end of the drive shaft and the boss portion of the differential case is also small.

Therefore, the smallest passage sectional area of a lubricating oil flow path that leads from the chamber space around the drive shaft to the chamber space inside the differential case through between the drive shaft and the boss portion of the differential case is smaller than the smallest passage sectional area of the lubrication hole. Therefore, a flow path resistance of the lubricating oil flow path that leads from the chamber space around the drive shaft to the chamber space inside the differential case through between the drive shaft and the boss portion of the differential case is high, so the flowrate of the lubricating oil that flows through this lubricating oil flow path is restricted. Thus, when the differential gear unit operates under severe operating conditions, there may not be sufficient lubrication between the drive shaft and the boss portion of the differential case, or between the shaft portion of the side gear and the boss portion of the differential case or the like. Therefore, portions where lubrication may be insufficient need to be plated with plating into which a solid lubricant has been mixed, or polished to a high degree such that their surface roughness becomes low.

SUMMARY OF THE INVENTION

In view of the foregoing problems with the related lubricating structure of a differential gear unit, this invention thus provides a lubricating structure of a differential gear unit that improves the lubrication performance in the differential gear unit by changing the relationship between the smallest passage sectional area of a lubricating oil flow path in each portion inside the differential gear unit.

Thus, a first aspect of the invention relates to a lubricating structure of a differential gear unit that has the constituent elements described below. That is, the first aspect of the invention relates to a lubricating structure of a differential gear unit that includes a pair of side gears that oppose each other and are fixed to a pair of drive shafts that are spaced apart and aligned with each other; a pair of pinions that are in mesh with the pair of side gears, in between the pair of side gears; a differential case that rotatably supports the side gears and the pinions about respective axes thereof, and that rotates the pair of side gears about the axis thereof while allowing differential rotation between the pair of side gears; a differential housing that rotatably supports, about an axis that matches the axis of the pair of side gears, the differential case via bearings arranged around the pair of drive shafts, a first chamber space being formed between the differential case and the differential housing, a second chamber space being formed around one of the drive shafts by an oil seal, the differential case, the differential housing, and one of the bearings, and a third chamber space being formed by the differential case, the pair of side gears, and the pair of pinions; and a first lubricating oil supplying device that supplies lubricating oil to the second chamber space. Also, a smallest passage sectional area of a lubricating oil flow path that leads from the second chamber space to the first chamber space through the one bearing is configured to be smaller than a smallest passage sectional area of a lubricating oil flow path of the first lubricating oil supplying device, and a smallest passage sectional area of a lubricating oil flow path between the second chamber space and the third chamber space and a smallest passage sectional area of a lubricating oil flow path in the third chamber space are configured to be larger than the smallest passage sectional area of the lubricating oil flow path of the first lubricating oil supplying device.

According to this lubricating structure, the smallest passage sectional area of the lubricating oil flow path that leads from the second chamber space to the first chamber space through the one bearing is smaller than the smallest passage sectional area of the lubricating oil flow path of the first lubricating oil supplying device. Therefore, it is possible to ensure that the second chamber space is filled with lubricating oil, so lubricating oil can be reliably supplied between the one drive shaft and a supporting portion of the differential case that rotatably supports the one drive shaft. As a result, it is possible to better lubricate between the two (i.e., between the one drive shaft and the supporting portion of the differential case that rotatably supports the one drive shaft).

Also according to the structure described above, the smallest passage sectional area of the lubricating oil flow path between the second chamber space and the third chamber space and the smallest passage sectional area of the lubricating oil flow path in the third chamber space are larger than the smallest passage sectional area of the lubricating oil flow path of the first lubricating oil supplying device. Therefore, compared with the related lubricating structure in which the magnitude relation of the two smallest passage sectional areas is reversed, the flow resistance of the lubricating oil flow path between the second chamber space and the third chamber space and flow resistance of the lubricating oil flow path in the third chamber space are reduced, so the flowrate of lubricating oil between the one drive shaft and the differential case, and between the side gears and the differential case, for example, can be increased.

Therefore, according to the structure described above, compared with the related lubricating structure, the flow resistance of the lubricating oil flow paths inside the differential gear unit are able to be reduced, so the lubrication performance inside the differential gear unit can be improved. Accordingly, there is no need to plate the portions that move relative one another inside the differential gear unit with plating into which a solid lubricant has been mixed, or polish those portions to a high degree such that their surface roughness becomes low.

Here, in the lubricating structure described above, the smallest passage sectional area of the lubricating oil flow path of the first lubricating oil supplying device may be a sectional area of a first lubrication hole provided in the differential case.

Also, in this structure, the smallest passage sectional area of the lubricating oil flow path in the third chamber space may be configured to be larger than the smallest passage sectional area of the lubricating oil flow path between the second chamber space and the third chamber space.

According to this structure, compared with when the magnitude relation of the two smallest passage sectional areas is reversed, the flow resistance of the lubricating oil flow path in the third chamber space is reduced, so the flowrate of lubricating oil between the side gears and the differential case, for example, can be increased.

When the relationship of the two smallest passage sectional areas is as described above, the clearance between the shaft portions of the side gears and the differential case, for example, is larger than it is when the magnitude relation of these smallest passage sectional areas is reversed. However, the pair of side gears are in mesh with the pair of pinions, so even if the magnitude relation of the two smallest passage sectional areas is set according to the invention, the side gears will not grind excessively.

In the structure described above, a first lubricating oil outflow suppressing device for suppressing lubricating oil from flowing out from the second chamber space to the first chamber space through the one bearing may be provided.

According to this structure, lubricating oil is suppressed by the first lubricating oil outflow suppressing device from flowing out to the first chamber space from the second chamber space through the one bearing. Therefore, compared with when the first lubricating oil outflow suppressing device is not provided, the flowrate of the lubricating oil from the second chamber space to the third chamber space can be increased, and as a result, the lubricating performance in the differential gear unit is able to be further improved.

Also, in the structure described above, the first lubricating oil outflow suppressing device may have a ring plate that is squeezed in between the differential housing and an outer end of the one bearing.

A second aspect of the invention relates to a lubricating structure of a differential gear unit that has the constituent elements described below. That is, the second aspect of the invention relates to a lubricating structure of a differential gear unit that includes a pair of side gears that oppose each other and are fixed to a pair of drive shafts that are spaced apart and aligned with each other; a pair of pinions that are in mesh with the pair of side gears, in between the pair of side gears; a differential case that rotatably supports the side gears and the pinions about respective axes thereof, and that rotates the pair of side gears about the axis thereof while allowing differential rotation between the pair of side gears; a differential housing that rotatably supports, about an axis that matches the axis of the pair of side gears, the differential case via bearings arranged around the pair of drive shafts, a first chamber space being formed between the differential case and the differential housing, a second chamber space being formed around one of the drive shafts by an oil seal, the differential case, the differential housing, and one of the bearings, a third chamber space being formed by the differential case, the pair of side gears, and the pair of pinions, and a fourth chamber space being formed around the other drive shaft by an oil seal, the differential case, the differential housing, and the other bearing; a first lubricating oil supplying device that supplies lubricating oil to the second chamber space; and a second lubricating oil supplying device that supplies lubricating oil to the fourth chamber space. Also, a smallest passage sectional area of a lubricating oil flow path that leads from the second chamber space to the first chamber space through the one bearing is configured to be smaller than a smallest passage sectional area of a lubricating oil flow path of the first lubricating oil supplying device, a smallest passage sectional area of a lubricating oil flow path between the second chamber space and the third chamber space and a smallest passage sectional area of a lubricating oil flow path in the third chamber space are configured to be larger than the smallest passage sectional area of the lubricating oil flow path of the first lubricating oil supplying device, a smallest passage sectional area of a lubricating oil flow path that leads from the fourth chamber space to the first chamber space through the other bearing is configured to be smaller than a smallest passage sectional area of a lubricating oil flow path of the second lubricating oil supplying device, and a smallest passage sectional area of a lubricating oil flow path between the fourth chamber space and the third chamber space and the smallest passage sectional area of the lubricating oil flow path in the third chamber space are configured to be larger than the smallest passage sectional area of the lubricating oil flow path of the second lubricating oil supplying device.

According to this structure, the smallest passage sectional area of the lubricating oil flow path from the fourth chamber space to the first chamber space through the other bearing is smaller than the smallest passage sectional area of the lubricating oil flow path of the second lubricating oil supplying device. Therefore, it is possible to ensure that the fourth chamber space is filled with lubricating oil, so lubricating oil can be reliably supplied between the other drive shaft and a supporting portion of the differential case that rotatably supports the other drive shaft. As a result, it is possible to better lubricate between the two (i.e., between the other drive shaft and the supporting portion of the differential case that rotatably supports the other drive shaft).

Also according to the structure described above, the smallest passage sectional area of the lubricating oil flow path between the fourth chamber space and the third chamber space and the smallest passage sectional area of the lubricating oil flow path in the third chamber space are larger than the smallest passage sectional area of the lubricating oil flow path of the second lubricating oil supplying device. Accordingly, compared with the related lubricating structure in which the magnitude relation of the two smallest passage sectional areas is reversed, the flow resistance of the lubricating oil flow path between the fourth chamber space and the third chamber space and the flow resistance of the lubricating oil flow path in the third chamber space are reduced, so the flowrate of lubricating oil between the other drive shaft and the differential case, and between the side gears and the differential case, for example, can be increased.

Also, the smallest passage sectional area of the lubricating oil flow path of the second lubricating oil supplying means may be a sectional area of a second lubrication hole provided in the differential case.

Also in the structure described above, the smallest passage sectional area of the lubricating oil flow path in the third chamber space may be configured to be larger than the smallest passage sectional area of the lubricating oil flow path between the fourth chamber space and the third chamber space.

According to the structure described above, compared with when the magnitude relation of the two smallest passage sectional areas is reversed, the flow resistance of the lubricating oil flow path in the third chamber space is reduced, even on the side of the fourth chamber space, so the flowrate of lubricating oil between the side gears and the differential case, for example, can be increased.

Also in the structure described above, a second lubricating oil outflow suppressing device for suppressing lubricating oil from flowing out from the fourth chamber space to the first chamber space through the other bearing may also be provided.

According to this structure, lubricating oil is suppressed by the second lubricating oil outflow suppressing device from flowing out to the first chamber space from the fourth chamber space through the other bearing. Therefore, compared with when the second lubricating oil outflow suppressing device is not provided, the flowrate of the lubricating oil from the fourth chamber space to the third chamber space can be increased, and as a result, the lubricating performance in the differential gear unit is able to be further improved.

Also, the second lubricating oil outflow suppressing device may have a ring plate that is squeezed in between the differential housing and an outer end of the other bearing.

Also in the structure described above, at least one of the one bearing and the other bearing may be an oilless bearing and may also function as a lubricating oil outflow suppressing device.

Also in the structure described above, the first lubricating oil outflow suppressing device may be arranged in the second chamber space and suppress lubricating oil from flowing into the one bearing from the second chamber space.

Also in the structure described above, the second lubricating oil outflow suppressing device may be arranged in the fourth chamber space and suppress lubricating oil from flowing into the other bearing from the fourth chamber space.

Also in the structure described above, a first spiral groove that leads lubricating oil from the second chamber space to the third chamber space may be provided on the outside surface of the one drive shaft or on the inside surface of the supporting portion of the differential case that rotatably supports the one drive shaft.

Also in the structure described above, a second spiral groove that leads lubricating oil from the fourth chamber space to the third chamber space may be provided on the outside surface of the other drive shaft or on the inside surface of the supporting portion of the differential case that rotatably supports the other drive shaft.

Also in the structure described above, the first lubricating oil supplying device may forcibly supply lubricating oil to the second chamber space.

Also in the structure described above, the second lubricating oil supplying device may forcibly supply lubricating oil to the fourth chamber space.

Also in the structure described above, the smallest passage sectional area of the lubricating oil flow path in the third chamber space may be the smallest passage sectional area between the shaft portion of the one side gear that is fixed to the one drive shaft and the differential case.

Also in the structure described above, the smallest passage sectional area of the lubricating oil flow path in the third chamber space may be the smallest passage sectional area between the shaft portion of the other side gear that is fixed to the other drive shaft and the differential case.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, first and second example embodiments of the invention will be described in detail with reference to the accompanying drawings.

Figure 1:
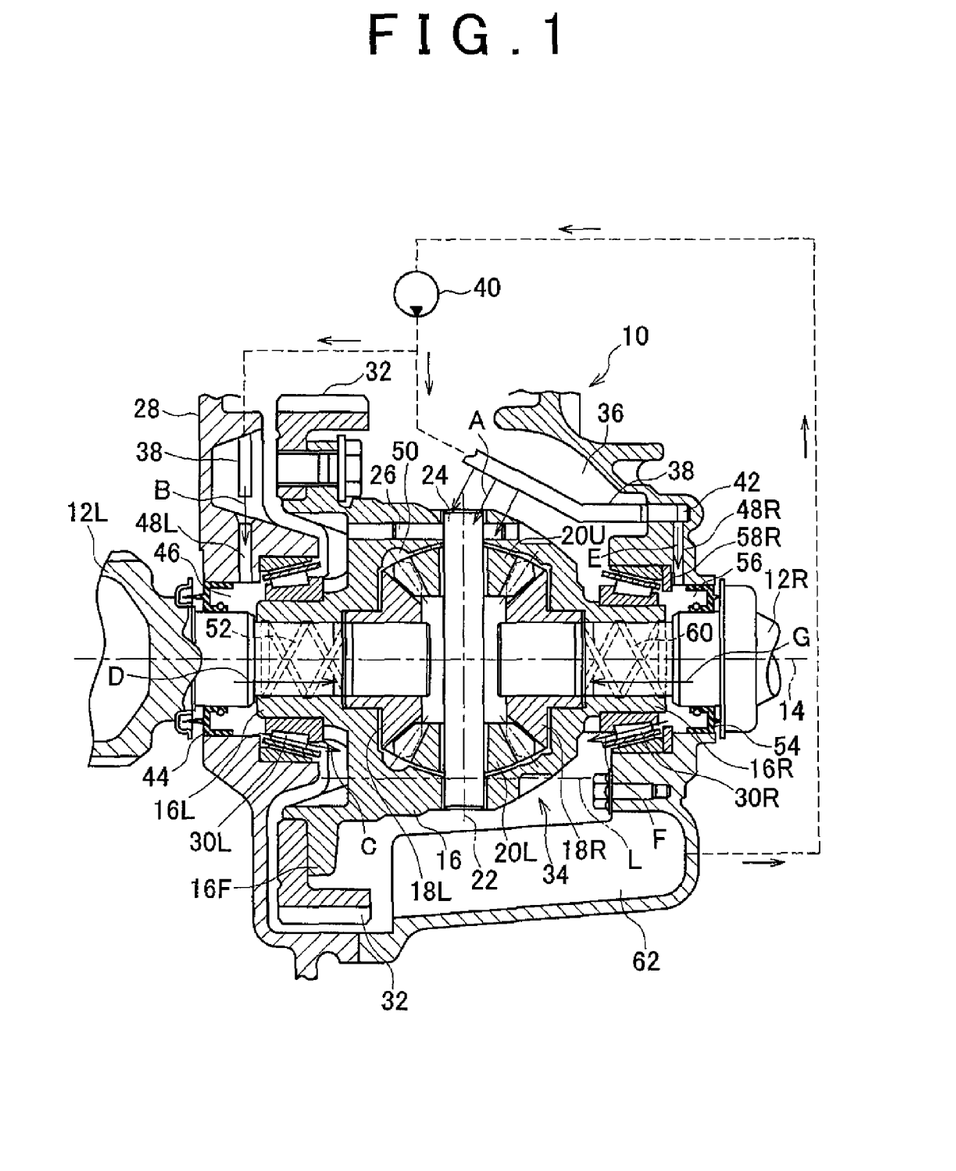
FIG. 1 is a partial sectional view of the main portions of a differential gear unit to which a first example embodiment of the lubricating structure of the invention has been applied.

FIG. 1 is a partial sectional view of the main portions of a differential gear unit to which a first example embodiment of the lubricating structure of the invention has been applied.

In FIG. 1, reference character 10 denotes a differential gear unit. The differential gear unit 10 transmits driving force from a propeller shaft or the like, not shown, to a pair of drive shafts 12L and 12R for right and left wheels, also not shown. The drive shafts 12L and 12R are spaced apart from each other and aligned on a common axis 14. The drive shafts 12L and 12R are fit tightly to boss portions 16L and 16R of a differential case 16, and are rotatably supported about the axis 14 by these boss portions. A pair of side gears 18L and 18R and a pair of pinions 20U and 20L are arranged inside the differential case 16.

The pair of side gears 18L and 18R are fixed by spline engagement, for example, to inside ends of the drive shafts 12L and 12R, respectively, while aligned with the axis 14 and opposing each other. Therefore, the pair of side gears 18L and 18R are able to rotate together with the drive shafts 12L and 12R about the axis 14. The pair of pinions 20U and 20L are positioned between the pair of side gears 18L and 18R while aligned on an axis 22 that is perpendicular to the axis 14 and opposing each another. The pair of pinions 20U and 20L are in mesh with the pair of side gears 18L and 18R.

The pair of pinions 20U and 20L are rotatably supported about the axis 22 by a pinion shaft 24. The pinion shaft 24 extends in the vertical direction aligned with the axis 22, and is supported by the differential case 16 at both ends. The pinion shaft 24 fits into a pair of holes provided in the differential case 16, and is restrained by a pin 26 so that it will not rotate about the axis 22. An opening is provided in a portion of the differential case 16 that is perpendicular to the surface of the paper on which FIG. 1 is drawn. This opening provides access to the side gears 18L and 18R and the pinions 20U and 20L from outside the differential case 16.

The differential case 16 is housed inside of a differential housing 28. The differential housing 28 rotatably supports the differential case 16 about the axis 14 via tapered roller bearings 30L and 30R that are arranged around the boss portions 16L and 16R of the differential case 16. A flange portion 16F that protrudes radially outward on the side of the pinion shaft 24 where the tapered roller bearing 30L is provided, is provided on an outer peripheral portion of the differential case 16. A ring gear 32 that is aligned with the axis 14 is fixed by a bolt to the flange portion 16F.

In particular, in the first example embodiment, the tapered roller bearings 30L and 30R are oilless bearings that require only a small amount of lubricating oil. In this first example embodiment, the bearings that rotatably support the differential case 16 about the axis 14 do not have to be oilless types as long as a small amount of lubricating oil passes through them. Also, other types of bearings such as ball bearings may also be used.

The ring gear 32 is in mesh with an input gear that is driven by a propeller shaft or the like, not shown. The differential case 16 is rotatably driven about the axis 14 by the ring gear 32 being rotatably driven by the input gear. The rotation of the differential case 16 is transmitted to the pair of drive shafts 12L and 12R via the pinion shaft 24, the pair of pinions 20U and 20L, and the pair of side gears 18L and 18R, such that these drive shafts 12L and 12R also rotate about the axis 14.

The pair of drive shafts 12L and 12R rotate together at the same rotation speed unless the pair of pinions 20U and 20L rotate about the axis 22. If the pair of pinions 20U and 20L rotate about the axis 22, the pair of side gears 18L and 18R will rotate with differential rotation. Accordingly, the pair of drive shafts 12L and 12R will rotate at different rotation speeds, such that a differential function is displayed.

Thus, the pair of side gears 18L and 18R, the pair of pinions 20U and 20L, and the differential case 16 together form a differential gear unit 34. The differential gear unit 34 transmits rotary torque about the axis 14 that is received by the differential case 16 to the drive shafts 12L and 12R, and enables the relative rotation of the drive shafts 12L and 12R.

A first chamber space 36 is formed between the differential case 16 and the differential housing 28, and the ring gear 32 and the input gear are arranged in this first chamber space 36. A lubricating oil supply conduit 38 is provided in the first chamber space 36 above the differential case 16, and this lubricating oil supply conduit 38 is communicated with an oil pump 40. The oil pump 40 draws up lubricating oil from a lubricating oil reservoir that will be described later, and supplies high-pressure lubricating oil at a constant flowrate to the lubricating oil supply conduit 38. The lubricating oil supply conduit 38 injects the lubricating oil into the differential case 16 and the like from above the differential case 16, as shown by arrows A in FIG. 1, thereby supplying lubricating oil to the meshing portions and the like of the side gears 18L and 18R and the pinions 20U and 20L.

An oil seal 44 is arranged close to an outside surface of the differential housing 28, between the drive shaft 12L and the differential housing 28. The oil seal 44, together with the drive shaft 12L, the differential case 16, the tapered roller bearing 30L, and the differential housing 28, forms a second chamber space 46. A first lubrication hole 48L (also referred to as a first forced lubrication hole 48L) is provided close to the tapered roller bearing 30L in the differential case 16. This first lubrication hole 48L communicatively connects the first chamber space 36 with the second chamber space 46.

The first lubrication hole 48L extends in the vertical direction perpendicular to the axis 14 of the drive shaft 12L, above the second chamber space 46. The first lubrication hole 48L receives lubricating oil from the lubricating oil supply conduit 38 at an upper end, as shown by arrow B in FIG. 1, and supplies this lubricating oil to the second chamber space 46. Therefore, the first lubrication hole 48L, together with the oil pump 40 and the lubricating oil supply conduit 38, forms a first lubricating oil supplying device.

The pair of side gears 18L and 18R and the pair of pinions 20U and 20L are spaced apart from the inside surface of the differential case 16, such that a third chamber space 50 is formed between them. The third chamber space 50 is communicatively connected to the first chamber space 36 by an opening, not shown, provided in the differential case 16. A shaft portion of the side gear 18L is fit relatively tightly together with the boss portion 16L so as to be able to rotate relative to the differential case 16 without rattling.

Two spiral grooves 52 that extend in a spiral around the axis 14 are provided on the inside surface of the boss portion 16L of the differential case 16. The spiral grooves 52 supply the lubricating oil that is inside the second chamber space 46 to the third chamber space 50 by the operation of an Archimedes pump when the drive shaft 12L rotates in the forward direction of the vehicle. Spiral grooves similar to the spiral grooves 52 may also be provided on the outside surface of the drive shaft 12L, or on both the inside surface of the boss portion 16L and the outside surface of the drive shaft 12L.

Just as with the drive shaft 12L, an oil seal 54 is arranged close to the outside surface of the differential housing 28, between the drive shaft 12R and the differential housing 28. The oil seal 54, together with the drive shaft 12R, the differential case 16, the tapered roller bearing 30R, and the differential housing 28, forms a fourth chamber space 56.

The fourth chamber space 56 is communicatively connected to the first chamber space 36 by a lubricating oil supply passage 42 and a second lubrication hole 48R (also referred to as a second forced lubrication hole). The lubricating oil supply passage 42 receives lubricating oil from the lubricating oil supply conduit 38, and this lubricating oil is supplied from the lubricating oil supply passage 42 to the fourth chamber space 56 through the second lubrication hole 48R. Thus, the second lubrication hole 48R, together with the oil pump 40, the lubricating oil supply conduit 38, and the lubricating oil supply passage 42, forms a second lubricating oil supplying device.

An outer race of the tapered roller bearing 30R is press-fit into a cylindrical platform portion provided in the differential housing 28, and a ring plate 58R is squeezed in between an outer end of the outer race and an end wall of the platform portion. The ring plate 58R is spaced apart from an inner race of the tapered roller bearing 30R, and an inner peripheral portion of the ring plate 58R is spaced apart from an outer peripheral surface of the boss portion 16R of the differential case 16. The ring plate 58R may also be omitted. Also, a ring plate similar to the ring plate 58R may also be provided with the tapered roller bearing 30L.

Two spiral grooves 60 that extend in a spiral around the axis 14 in the opposite direction of the spiral grooves 52 are provided on the inside surface of the boss portion 16R of the differential case 16. The spiral grooves 60 move lubricating oil that is inside the fourth chamber space 56 to the third chamber space 50 by the operation of an Archimedes pump when the drive shaft 12R rotates in the forward direction of the vehicle. Spiral grooves similar to the spiral grooves 60 may also be provided on the outside surface of the drive shaft 12R, or on both the inside surface of the boss portion 16R and the outside surface of the drive shaft 12R. Also, a shaft portion of the side gear 18R is fit relatively tightly together with the boss portion 16R so as to be able to rotate relative to the differential case 16 without rattling.

A lower portion of the first chamber space 36 serves as a lubricating oil reservoir 62, and a portion of the ring gear 32 and the differential case 16 are maintained immersed in the lubricating oil accumulated in the lubricating oil reservoir 62. In FIG. 1, reference character L denotes the normal level of lubricating oil accumulated in the lower portion of the first chamber space 36. Thus, when the differential case 16 rotates about the axis 14, lubricating oil is thrown up to an upper portion of the first chamber space 36 by the differential case 16 and the ring gear 32.

The pressure of the first chamber space 36 is maintained at atmospheric pressure. Also, as described above, the second chamber space 46, the third chamber space 50, and the fourth chamber space 56 are communicatively connected to the first chamber space 36, so the pressure of these chamber spaces is also atmospheric pressure.

The second chamber space 46 is partially filled with lubricating oil supplied through the first lubrication hole 48L (arrow B), and a small portion of the lubricating oil in the second chamber space 46 lubricates the tapered roller bearing 30L and moves to the lower portion of the first chamber space 36 through the tapered roller bearing 30L, as shown by arrow C in FIG. 1. The majority of the lubricating oil in the second chamber space 46 lubricates between the drive shaft 12L and the boss portion 16L of the differential case 16, and moves to the third chamber space 50 through the spiral grooves 52, as shown by arrow D in FIG. 1.

Similarly, the fourth chamber space 56 is also partially filled with lubricating oil supplied from the second lubrication hole 48R that is communicated with the lubricating oil supply passage 42, as shown by arrow E in FIG. 1. Also, a small portion of the lubricating oil in the fourth chamber space 56 moves to the lower portion of the first chamber space 36 through the tapered roller bearing 30R, as shown by arrow F in FIG. 1. The majority of the lubricating oil in the fourth chamber space 56 lubricates between the drive shaft 12R and the boss portion 16R of the differential case 16, and moves to the third chamber space 50 through the spiral grooves 60, as shown by arrow G in FIG. 1.

The lubricating oil that has moved to the third chamber space 50 lubricates between the shaft portions of the pair of side gears 18L and 18R and the differential case 16, and is drawn radially outward by the centrifugal pump action from the differential case 16 and the like rotating about the axis 14. Thus, the lubricating oil that is drawn up and the lubricating oil that has been injected by the lubricating oil supply conduit 38 and lubricated the side gears 18L and 18R and the like drops down to the lower portion of the first chamber space 36 through the opening in the differential case 16, thus returning to the lubricating oil reservoir 62.

Figure 2:
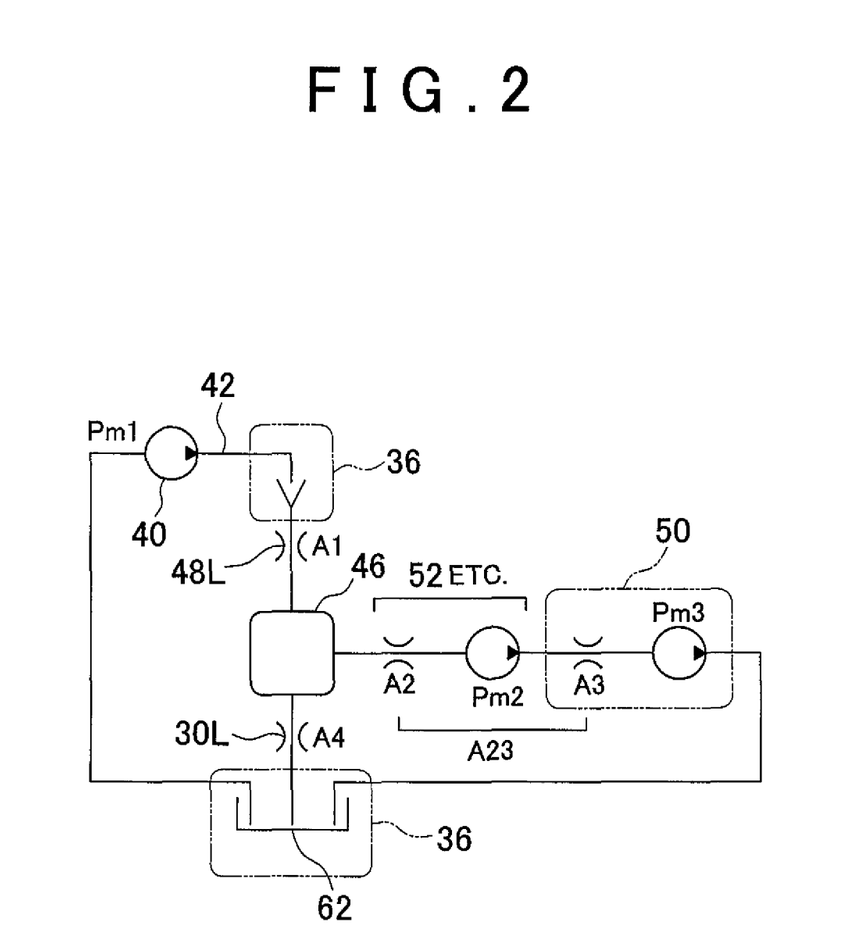
FIG. 2 is a view showing a frame format for illustrating the flow of lubricating oil in the first example embodiment.

FIG. 2 is a view showing a frame format for illustrating the flow of lubricating oil in the first example embodiment. As shown in FIG. 2, the smallest passage sectional area of the first lubrication hole 48L is designated A1. The smallest passage sectional area of the lubricating oil flow path between the second chamber space 46 and the third chamber space 50, i.e., the smallest passage sectional area between the boss portion 16L of the differential case 16 and the drive shaft 12L, is designated A2. The smallest passage sectional area of the lubricating oil flow path of the cylindrical gap (i.e., space) between the shaft portion of the side gear 18L and the differential case 16, i.e., the smallest passage sectional area of the lubricating oil flow path in the third chamber space 50 on the side of the second chamber space 46, is designated A3.

Also, the smaller of the smallest passage sectional areas A2 and A3 is designated smallest passage sectional area A23. Moreover, the smallest passage sectional area of the flow path of lubricating oil from the second chamber space 46 directly to the first chamber space 36 through the tapered roller bearing 30L is designated A4. Also, the oil pump 40 is designated pump Pm1, the pump from the pump action of the spiral grooves 52 is designated pump Pm2, and the pump from the centrifugal pump action inside the differential case 16 is designated pump Pm3.

In the related lubricating structure of a differential gear unit, the smallest passage sectional areas A2 and A3 are smaller than the smallest passage sectional area A1, so the smallest passage sectional area A23 is smaller than the smallest passage sectional area A1. That is, the inequality expressions 1 to 3 below are satisfied. The smallest passage sectional area A2 may be larger or smaller than the smallest passage sectional area A3, depending on the size of the passage sectional area of the spiral grooves 52.

$$A1 > A2 \tag{1}$$

$$A1 > A3 \tag{2}$$

$$A1 > A23 \tag{3}$$

In the first example embodiment, unlike with the related lubricating structure of a differential gear unit, the smallest passage sectional areas A2, A3, and A23 are set to larger values than the smallest passage sectional area A1. Also, the smallest passage sectional area A4 is set to a smaller value than any of the smallest passage sectional areas A1, A2, A3, and A23. That is, the smallest passage sectional areas A1, A2, A3, A23, and A4 are set such that the inequality expressions 4 to 7 below are satisfied. Either one of the smallest passage sectional areas A2 and A3 may by large.

$$A1 < A2 \tag{4}$$

$$A1 < A3 \tag{5}$$

$$A1 < A23 \tag{6}$$

$$A4 < A1 \tag{7}$$

The relationship in the inequality expression 4 above may be achieved by setting the passage sectional area of the spiral grooves 52 according to its relationship with the smallest passage sectional area A1 of the first lubrication hole 48L, without increasing the clearance between the boss portion 16L and the drive shaft 12L compared with the related art. Also, the relationship in the inequality expression 5 above may be achieved by increasing the clearance between the shaft portion of the side gear 18L and the differential case 16 compared with the related art, but it may also be achieved by providing a groove that extends along the axis 14 in the shaft portion, for example.

Also, when the smallest passage sectional area A3 is larger than the smallest passage sectional area A2, the clearance between the shaft portions of the side gears 18L and 18R and the differential case 16 may be larger than when the magnitude relation of the smallest passage sectional areas A2 and A3 is reversed. However, the side gears 18L and 18R are in mesh with the pinions 20U and 20L, so even if A3 is larger than A2, the side gears 18L and 18R will neither whirl nor grind excessively.

According to the first example embodiment, the inequality expression 4 exists, so the flowrate of lubricating oil that flows out directly to the first chamber space 36 from the second chamber space 46 through the tapered roller bearing 30L is less than the flowrate of lubricating oil that flows into the first chamber space 36 from the first lubrication hole 48L. Therefore, it is possible to ensure that at least the lower portion of the second chamber space 46 is always filled with lubricating oil, so the second chamber space 46 is able to function as a lubricating oil reservoir. Accordingly, lubricating oil accumulated in the second chamber space 46 is well supplied between the boss portion 16L of the differential case 16 and the drive shaft 12L, so therebetween as well as between the shaft portion of the side gear 18L and the differential case 16 are able to be well lubricated.

Also, according to the first example embodiment, the smallest passage sectional areas A2, A3, and A23 are larger than the smallest passage sectional area A1. Therefore, the flow resistance of the lubricating oil flow path from the second chamber space 46 to the third chamber space 50 through between the boss portion 16L of the differential case 16 and the drive shaft 12L can be made smaller, compared with the related structure in which the inequality expressions 1 to 3 above are satisfied. Accordingly, this also enables between the boss portion 16L of the differential case 16 and the drive shaft 12L and between the shaft portion of the side gear 18L and the differential case 16 to be well lubricated compared with the related art.

The smallest passage sectional areas A1 to A4 are also set the same way for the lubricating oil flow path that leads from the second lubrication hole 48R to the third chamber space 50 through the fourth chamber space 56 and the spiral grooves 60, and the lubricating oil flow path that leads from the second lubrication hole 48R to the first chamber space 36 through the tapered roller bearing 30R.

Thus, according to the first example embodiment, it is possible to ensure that the second chamber space 46 and the fourth chamber space 56 are always filled with lubricating oil, so between the differential case 16 and the drive shafts 12L and 12R and between the differential case 16 and the side gears 18L and 18R are able to be well lubricated.

In particular, according to the first example embodiment, the tapered roller bearings 30L and 30R are oilless bearings, so the flowrate of the lubricating oil that flows out from the second chamber space 46 and the fourth chamber space 56 directly to the first chamber space 36 through the tapered roller bearings 30L and 30R, respectively, can be made an extremely small value without requiring special means.

Figure 3:
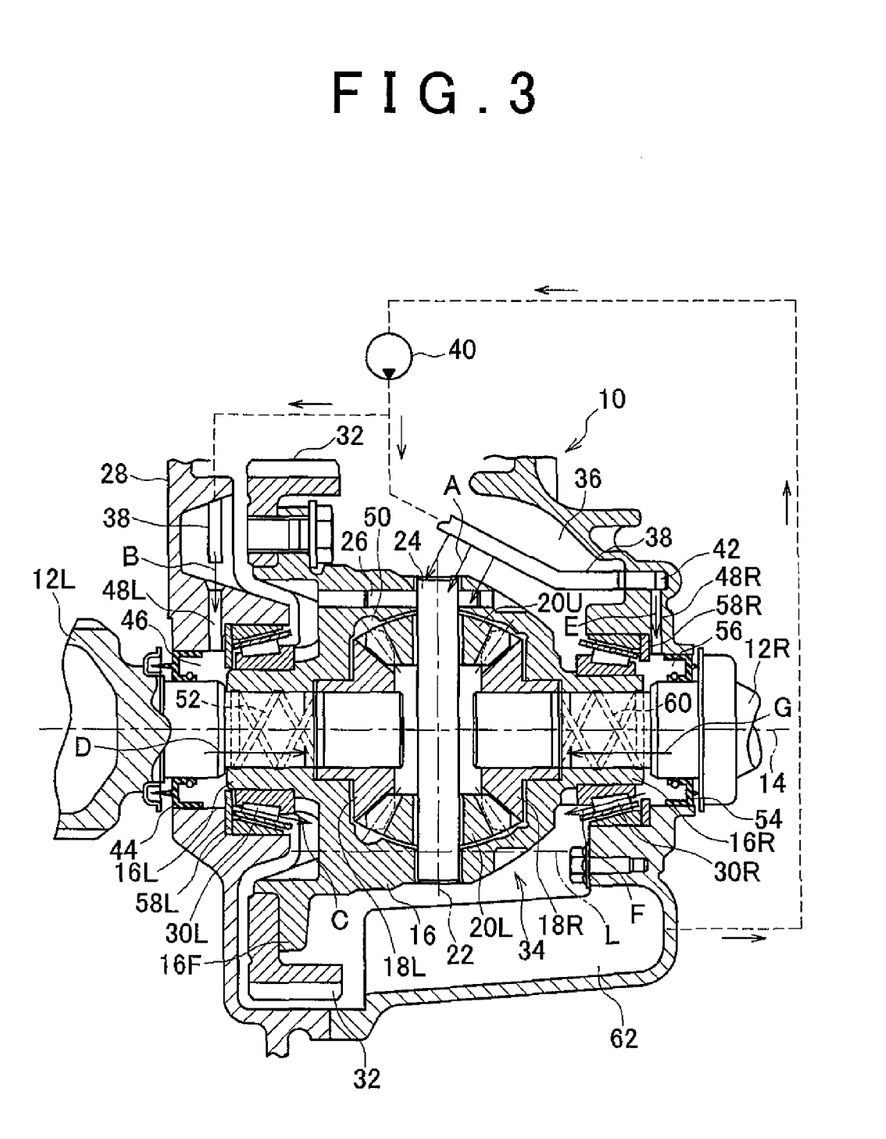
FIG. 3 is a partial sectional view showing the main portions of a differential gear unit to which a second example embodiment of the lubricating structure of the invention has been applied.

FIG. 3 is a partial sectional view showing the main portions of a differential gear unit to which a second example embodiment of the lubricating structure of the invention has been applied. Members in FIG. 3 that are the same as members shown in FIG. 1 will be denoted by the same reference characters as accompanying reference characters in FIG. 1.

In this second example embodiment, the tapered roller bearings 30L and 30R are normal tapered roller bearings that are not oilless and thus require lubricating oil. The outer race of the tapered roller bearing 30L is press-fit into a cylindrical platform portion provided in the differential housing 28, and a ring plate 58L is squeezed in between an outer end of the outer race and an end wall of the platform portion.

The ring plates 58R and 58L are only slightly spaced apart from the inner races of the tapered roller bearings 30R and 30L, and the inner peripheral portions are close to the outer peripheral surfaces of the boss portions 16R and 16L of the differential case 16. Accordingly, the ring plates 58R and 58L will neither contact the inner races of the tapered roller bearings 30R and 30L nor the boss portions 16R and 16L of the differential case 16 respectively, even if the differential case 16 rotates relative to the differential housing 28 about the axis 14. The ring plates 58R and 58L act as a lubricating oil flow suppressing device that suppresses the outflow of lubricating oil from the second chamber space 46 and the fourth chamber space 50 to the first chamber space 36 through the tapered roller bearings 30R and 30L, respectively.

The other points of the second example embodiment are similar to those of the first example embodiment described above. Therefore, the magnitude relation of the smallest passage sectional areas of the lubricating oil flow paths and the like are also set as they are in the first example embodiment described above.

Thus, according to the second example embodiment, it is possible to ensure that the second and fourth chamber spaces 46 and 56 are filled with lubricating oil, so between the boss portions 16L and 16R of the differential case 16 and the drive shafts 12L and 12R is able to be well lubricated, just as in the first example embodiment.

In particular, according to the second example embodiment, the tapered roller bearings 30L and 30R are normal tapered roller bearings, so the lubricating structure can be made less expensive compared with when the bearings are oilless bearings.

In the first and second example embodiments, the smallest passage sectional area A3 may be smaller than the smallest passage sectional area A2, but the smallest passage sectional area A3 is preferably larger than the smallest passage sectional area A2. If the smallest passage sectional area A3 is larger than the smallest passage sectional area A2, the flow resistance when lubricating oil passes between the shaft portions of the side gears 18L and 18R and the differential case 16 decreases, so the flowrate of the lubricating oil can be increased.

While the invention has been described in detail with reference to specific example embodiments, the invention is not limited to these example embodiments. It should be understood by one skilled in the art that other various example embodiments are possible within the scope of the invention.

For example, in the first and second example embodiments described above, the two spiral grooves 52 and 60 that extend in spirals around the axis 14 are provided on the inside surface of the boss portions 16L and 16R of the differential case 16, but at least one of these spiral grooves may also be omitted.

Further, in the first and second example embodiments described above, the smallest passage sectional areas A1, A2, A3, A23, and A4 are set to satisfy the inequality expressions 4 to 7 above. However, when the spiral grooves 52 and 60 are provided and the function of these as a pump is sufficient, the smallest passage sectional areas A1, A2, A3, A23, and A4 may also be set to satisfy the inequality expressions 8 to 10 below, instead of the inequality expressions 4 to 6 above.

$$A1 > A2 \quad (8)$$

$$A1 < A3 \quad (9)$$

$$A2 < A3 \quad (10)$$

Also in the first and second example embodiments described above, the lubricating structure of the invention is applied to both left and right regions of the differential gear unit corresponding to the pair of drive shafts. Alternatively, however, the lubricating structure of the invention may also be applied only to one of the left and right regions of the differential gear unit.

Further, the lubricating oil outflow suppressing device is the oilless tapered roller bearings 30L and 30R in the first example embodiment, and the ring plates 58L and 58R in the second example embodiment. However, the lubricating oil outflow suppressing device may be any appropriate structure as long as it is able to suppress the outflow of lubricating oil. Also, at least one of the lubricating oil outflow suppressing devices which are the lubricating oil flow suppressing device that suppresses the outflow of lubricating oil from the second chamber space 46 to the first chamber space 36 through the tapered roller bearings 30L and the lubricating oil flow suppressing device that suppresses the outflow of lubricating oil from the fourth chamber space 50 to the first chamber space 36 through the tapered roller bearings 30R may be omitted.

Also, in the example embodiments described above, the first and second lubricating oil supplying devices supply high-pressure lubricating oil by an oil pump, but the first and second lubricating oil supplying devices may be any appropriate structure as long as it is able to supply lubricating oil to the second and fourth chamber spaces through the first and second lubrication holes.

Also, in the example embodiments described above, the differential gear unit is a differential gear unit for an automobile, but the lubricating structure of the invention may also be applied to a differential gear unit to be used in something other than an automobile.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A lubricating structure of a differential gear unit, comprising:
   a pair of side gears that oppose each other and are fixed to a pair of drive shafts that are spaced apart and aligned with each other;
   a pair of pinions that are in mesh with the pair of side gears, in between the pair of side gears;
   a differential case that rotatably supports the side gears and the pinions about respective axes thereof, and that rotates the pair of side gears about the axis thereof while allowing differential rotation between the pair of side gears;
   a differential housing that rotatably supports, about an axis that matches the axis of the pair of side gears, the differential case via bearings arranged around the pair of drive shafts, a first chamber space being formed between the differential case and the differential housing, a second chamber space being formed around one of the drive shafts by an oil seal, the differential case, the differential housing, and one of the bearings, and a third chamber space being formed by the differential case, the pair of side gears, and the pair of pinions; and
   a first lubricating oil supplying device that supplies lubricating oil to the second chamber space,
   wherein a smallest passage sectional area of a lubricating oil flow path that leads from the second chamber space to the first chamber space through the one bearing is configured to be smaller than a smallest passage sectional area of a lubricating oil flow path of the first lubricating oil supplying device; and a smallest passage sectional area of a lubricating oil flow path between the second chamber space and the third chamber space and a smallest passage sectional area of a lubricating oil flow path in the third chamber space are configured to be larger than the smallest passage sectional area of the lubricating oil flow path of the first lubricating oil supplying device.

2. The lubricating structure according to claim 1, wherein the smallest passage sectional area of the lubricating oil flow path of the first lubricating oil supplying device is a sectional area of a first lubrication hole provided in the differential case.

3. The lubricating structure according to claim 1, wherein the smallest passage sectional area of the lubricating oil flow path in the third chamber space is configured to be larger than the smallest passage sectional area of the lubricating oil flow path between the second chamber space and the third chamber space.

4. The lubricating structure according to claim 1, further comprising a first lubricating oil outflow suppressing device that suppresses lubricating oil from flowing out from the second chamber space to the first chamber space through the one bearing.

5. The lubricating structure according to claim 4, wherein the first lubricating oil outflow suppressing device has a ring plate that is squeezed in between the differential housing and an outer end of the one bearing.

6. The lubricating structure according to claim 4, wherein
   wherein the lubricating device includes a fourth chamber space being formed around the other drive shaft by an oil seal, the differential case, the differential housing, and the other bearing; and
   a second lubricating oil supplying device that supplies lubricating oil to the fourth chamber space,
   wherein a smallest passage sectional area of a lubricating oil flow path that leads from the fourth chamber space to the first chamber space through the other bearing is configured to be smaller than a smallest passage sectional area of a lubricating oil flow path of the second lubricating oil supplying device; and a smallest passage sectional area of a lubricating oil flow path between the fourth chamber space and the third chamber space and the smallest passage sectional area of the lubricating oil flow path in the third chamber space are configured to be larger than the smallest passage sectional area of the lubricating oil flow path of the second lubricating oil supplying device.

7. The lubricating structure according to claim 6, wherein the smallest passage sectional area of the lubricating oil flow path of the second lubricating oil supplying device is a sectional area of a second lubrication hole provided in the differential case.

8. The lubricating structure according to claim 6, wherein the smallest passage sectional area of the lubricating oil flow path in the third chamber space is configured to be larger than the smallest passage sectional area of the lubricating oil flow path between the fourth chamber space and the third chamber space.

9. The lubricating structure according to claim 6, further comprising a second lubricating oil outflow suppressing device that suppresses lubricating oil from flowing out from the fourth chamber space to the first chamber space through the other bearing.

10. The lubricating structure according to claim 9, wherein the second lubricating oil outflow suppressing device has a ring plate that is squeezed in between the differential housing and an outer end of the other bearing.

* * * * *